(12) United States Patent
Schliwa-Bertling et al.

(10) Patent No.: US 11,785,653 B2
(45) Date of Patent: Oct. 10, 2023

(54) DISTRIBUTED UNIT, PROXY CENTRAL UNIT AND METHODS IN A WIRELESS COMMUNICATIONS NETWORK

(71) Applicant: Telefonaktiebolaget LM Ericsson (publ), Stockholm (SE)

(72) Inventors: Paul Schliwa-Bertling, Ljungsbro (SE); Peter Werner, Linköping (SE); Stefan Engström, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 189 days.

(21) Appl. No.: 17/425,780

(22) PCT Filed: Nov. 18, 2019

(86) PCT No.: PCT/SE2019/051168
§ 371 (c)(1),
(2) Date: Jul. 26, 2021

(87) PCT Pub. No.: WO2020/159415
PCT Pub. Date: Aug. 6, 2020

(65) Prior Publication Data
US 2022/0174756 A1  Jun. 2, 2022

Related U.S. Application Data

(60) Provisional application No. 62/799,780, filed on Feb. 1, 2019.

(51) Int. Cl.
*H04L 61/00* (2022.01)
*H04W 76/11* (2018.01)
(Continued)

(52) U.S. Cl.
CPC ......... *H04W 76/11* (2018.02); *H04L 61/4511* (2022.05); *H04W 88/085* (2013.01)

(58) Field of Classification Search
CPC ... H04W 76/11; H04W 88/085; H04W 24/02; H04W 76/12; H04L 61/4511
See application file for complete search history.

(56) References Cited

U.S. PATENT DOCUMENTS

2017/0111322 A1* 4/2017 Patidar ................ H04L 63/0823
2017/0295236 A1* 10/2017 Kulkarni ............. H04L 67/1097
(Continued)

FOREIGN PATENT DOCUMENTS

WO  2018200570 A1  11/2018
WO  2018202189 A1  11/2018
(Continued)

OTHER PUBLICATIONS

Ericsson (F1 Setup Procedure), Jun. 2017.*
(Continued)

*Primary Examiner* — Lakeram Jangbahadur
(74) *Attorney, Agent, or Firm* — Christopher & Weisberg, P.A.

(57) ABSTRACT

Embodiments herein relate to a method performed by a distributed unit of a network node, for establishing a connection between the distributed unit and a central unit connected to a core part of the wireless network. The network node includes the central unit and at least the distributed unit. The distributed unit performs a Domain Name Server lookup for a proxy central unit, which will act as a temporary or initial central unit with regard to a configuration transfer procedure. The distributed unit further receives an ip address of the proxy central unit and initiates the configuration transfer procedure by sending a configuration transfer message to the ip address of the proxy central unit. The distributed unit further receives an ip address of the (Continued)

central unit and establishes a connection between the distributed unit and the central unit using the received ip address of the central unit.

8 Claims, 11 Drawing Sheets

(51) Int. Cl.
*H04L 61/4511* (2022.01)
*H04W 88/08* (2009.01)

(56) References Cited

U.S. PATENT DOCUMENTS

| | | | |
|---|---|---|---|
| 2018/0376380 | A1 | 12/2018 | Leroux |
| 2020/0110627 | A1* | 4/2020 | Chou .................. H04L 41/12 |
| 2020/0351963 | A1* | 11/2020 | Shuai ................. H04W 84/12 |
| 2022/0124542 | A1* | 4/2022 | Li ........................ H04W 4/80 |

FOREIGN PATENT DOCUMENTS

| | | | |
|---|---|---|---|
| WO | 2019144679 | A1 | 8/2019 |
| WO | 2019214709 | A1 | 11/2019 |

OTHER PUBLICATIONS

International Search Report and Written Opinion dated Feb. 13, 2020 for International Application No. PCT/SE2019/051168 filed Nov. 18, 2019, consisting of 11-pages.
3GPP TSG-RAN WG3 Meeting #101bis R3-185914; Title: Introducing X2 TNL Address discovery for en-gNBs for EN-DC; Agenda Item: 31.3.3; Source: Ericsson, Vodafone; Document for: Discussions & approval; Date and Location: Oct. 8-12, 2018, Chengdu, P.R. China, consisting of 15-pages.
3GPP TSG-RAN WG3 Meeting #101 R3-184694; Title: IAB topological redundancy for architecture 1a; Agenda Item: 24.2; Source: Qualcomm Incorporated; Document for: Discussion; Date and Location: Aug. 20-24, 2018, Gothenburg, Sweden, consisting of 10-pages.
3GPP TSG-RAN WG3 Meeting #105bis R3-194994 was R3-193979; Title: Further discussion on IP address issues of IAB network; Agenda Item: 13.2.1.3 (IP Address management); Source: Samsung; Document for: Discussion & Decision; Date and Location: Oct. 14-18, 2019, Chongqing, China, consisting of 4-pages.
3GPP TSG-RAN WG3 #106 R3-196686; Title: The Remaining Issues on IP Address Allocation in IAB; Agenda Item: 13.2.1.3; Source: ZTE, Sanechips; Document for: Discussion; Date and Location: Nov. 18-22, 2019, Reno, NV, USA, consisting of 2-pages.
3GPP TS 38.401 V15.3.0; 3rd Generation Partnership Project; Technical Specification Group Radio Access Network; NG-RAN; Architecture description (Release 15); Sep. 2018, consisting of 39-pages.
3GPP TS 38.401 V0.1.0; 3rd Generation Partnership Project; Technical Specification Group Radio Access Network; NG-RAN; Architecture description (Release 15); May 2017, consisting of 18-pages.
3GPP TS 33.401 V15.5.0; 3rd Generation Partnership Project; Technical Specification Group Services and System Aspects; 3GPP System Architecture Evolution (SAE); Security architecture (Release 15); Sep. 2018, consisting of 163-pages.
3GPP TS 23.501 V15.3.0; 3rd Generation Partnership Project; Technical Specification Group Services and System Aspects; System Architecture for the 5G System; Stage 2 (Release 15); Sep. 2018, consisting of 226-pages.
EPO Communication with Supplementary European Search Report dated Oct. 21, 2022 for Patent Application No. 19913973.4, consisting of 12-pages.
3GPP TSG-RAN WG3 Meeting #96 R3-171635; Title: Interface between gNB-CU/gNB-DU and O&M; Agenda Item: 10.10.1; Source: Samsung, KT, SK Telecom; Document for: Discussion & Decision; Date and Location: May 15-19, 2017, Hangzhou, P. R. China, consisting of 2-pages.
3GPP TSG-RAN WG3#NR_Adhoc Tdoc R3-172515; Title: F1 Setup Procedure; Agenda Item: 10.10.1; Source: Ericsson; Document for: Discussion, Decision; Date and Location: Jun. 26-29, 2017, Qingdao, China, consisting of 3-pages.
3GPP TSG-RAN WG3 NR Ad hoc #1 R3-180282; Title: TNL address discovery for Option 3; Agenda Item: 31.3.3; Source: LG Electronics Inc.; Document for: Discussion; Date and Location: Jan. 22-26, 2018, Sophia Antipolis, France, consisting of 2-pages.
3GPP TR 21.915 V0.4.0; 3rd Generation Partnership Project; Technical Specification Group Services and System Aspects; Release 15 Description; Summary of Rel-15 Work Items (Release 15); Oct. 2018, consisting of 107-pages.

* cited by examiner

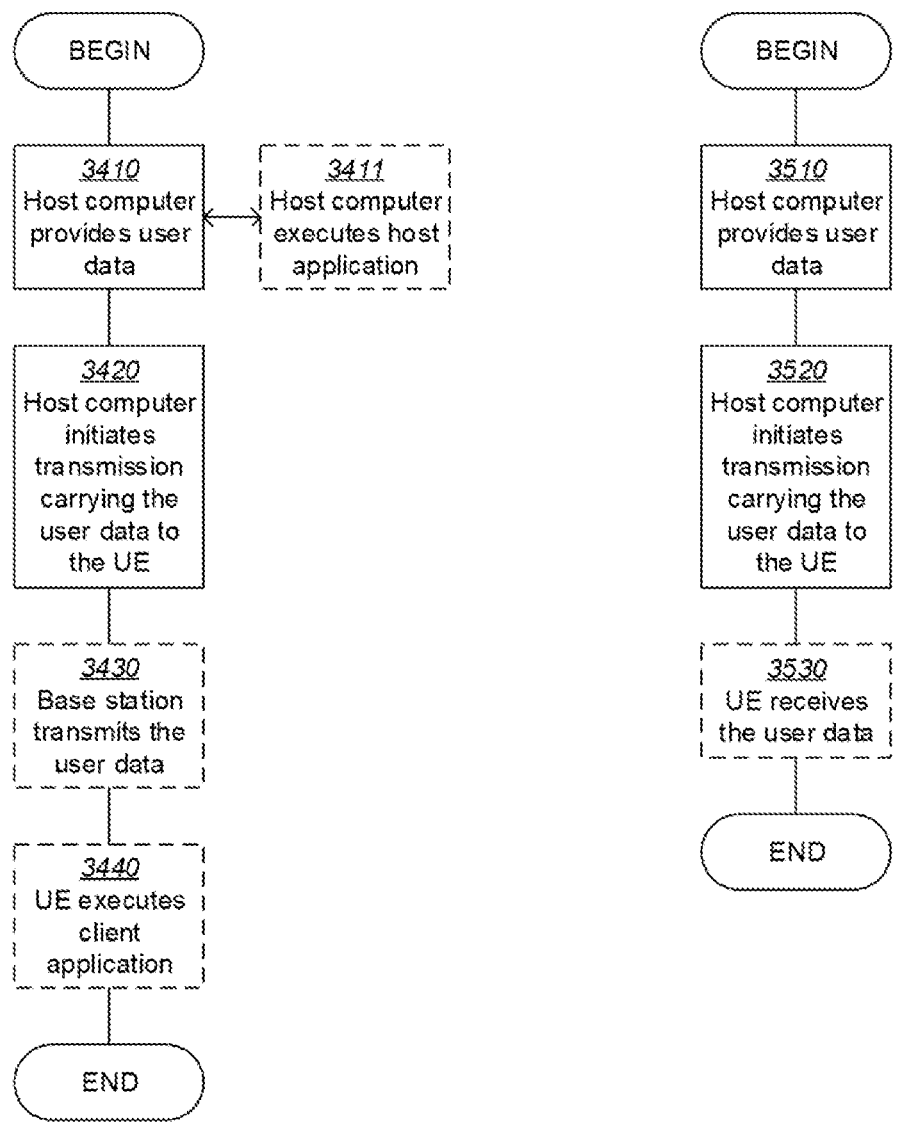

DISTRIBUTED UNIT, PROXY CENTRAL UNIT AND METHODS IN A WIRELESS COMMUNICATIONS NETWORK

CROSS-REFERENCE TO RELATED APPLICATIONS

This application is a Submission Under 35 U.S.C. § 371 for U.S. National Stage Patent Application of International Application No.: PCT/SE2019/051168, filed Nov. 18, 2019 entitled "DISTRIBUTED UNIT, PROXY CENTRAL UNIT AND METHODS IN A WIRELESS COMMUNICATIONS NETWORK," which claims priority to U.S. Provisional Application No. 62/799,780, filed Feb. 1, 2019, entitled "DISTRIBUTED UNIT, PROXY CENTRAL UNIT AND METHODS IN A WIRELESS COMMUNICATIONS NETWORK," the entireties of both of which are incorporated herein by reference.

TECHNICAL FIELD

Embodiments herein relate to a distributed unit, a proxy central unit and methods therein. In particular, they relate to establishing connections in a wireless communication network.

BACKGROUND

In a typical wireless communication network, wireless devices, also known as wireless communication devices, mobile stations, stations (STA) and/or User Equipment (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5th Generation (5G). A service area or cell area is a geographical area where radio coverage is provided by the radio network node. The radio network node communicates over an air interface operating on radio frequencies with the wireless device within range of the radio network node. The radio network node communicates to the wireless device in DownLink (DL) and from the wireless device in UpLink (UL).

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to Radio Network Controllers (RNCs) used in 3rd Generation (3G) networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of Things (IoT), aiming at lower cost, lower battery consumption and lower latency than 4G equipment.

The current 5G RAN architecture is described in the 3GPP document TS 38.401 v0.1.0 and a schematic illustration of this architecture is presented in FIG. 1. This figure shows two example network nodes denoted gNB, of an NG-RAN and each gNB comprises a central unit denoted gNB-CU which is connected to a core part of a wireless network, denoted 5GC, and a number of distributed units denoted gNB-DU which are used for radio communication with wireless devices, not shown.

In the field of wireless communication, the term "core part" is frequently used as a synonym for core network, and wireless networks typically comprise a RAN, or "radio part", which handles radio communication with wireless devices and a Core Network CN, i.e. the core part, which basically controls and supervises the radio access network. Here, two gNB-DUs are shown in each gNB as an example, although a gNB may basically comprise any number of gNB-DUs including only one gNB-DU. A RAN may further comprise any number of gNBs while only two are shown here for simplicity.

The NG architecture shown in FIG. 1 can be further described as follows:
  The NG-RAN comprises a set of gNBs connected to the 5GC through the NG interface.
  A gNB can support Frequency Division Duplex FDD mode, Time Division Duplex TDD mode or dual mode operation of both FDD and TDD modes.
  gNBs can be interconnected through the Xn interface.
  A gNB may comprise a gNB-CU and a number of gNB-DUs. A gNB-CU and a gNB-DU can be interconnected via the F1 logical interface.
  One gNB-DU is typically connected to only one gNB-CU while a gNB-CU may be connected to any number of gNB-DUs.
  It may be noted that to achieve resiliency in providing radio coverage, a gNB-DU may be connected to multiple gNB-CUs by appropriate implementation.

The above-mentioned interfaces NG, Xn and F1 are logical interfaces. The NG-RAN is layered to comprise a Radio Network Layer (RNL) and a Transport Network Layer (TNL). The NG-RAN architecture, i.e. comprised of the NG-RAN logical nodes and interfaces between these nodes, is defined as part of the RNL. For each NG-RAN interface (NG, Xn, F1) the related TNL protocol and functionalities are specified. The TNL provides services for user plane transport, as well as signalling transport. In a so-called NG-Flex configuration, each gNB can be connected to all 5GC nodes within a set serving the same area. A set in this context is defined in 3GPP TS 23.501 v15.3.0. If security protection is required or desired for control plane and user plane data on TNL of NG-RAN interfaces, IP Network Domain Security (NDS/IP), as described in 3GPP TS 33.401 v15.5.0 may be applied.

A distributed unit (DU) and a central unit (CU) may from an operation and maintenance (O&M) perspective be manually deployed with only a minimum of radio network configuration, i.e. NR-GNB ID in the CU node and NR-GNB+cell ID+Tracking Area Identity (TAI) configuration in the DU node. Underlying transport network configuration after auto-integration may be avoided especially for the new F1 interface. Also there is a lack of support for zero touch. Therefore there is a need for simplifying the configuration of the DU by automatizing the configuration.

Further, the term "network node", is used herein to represent any node of a wireless network that is operative to communicate signals and messages with wireless devices. The network node in this disclosure may include a base station, radio node, Node B, base transceiver station, access point, etc., although this disclosure is not limited to these examples. The network node in this disclosure may also include a communication control node in the wireless network, such as an RNC or a core network node, that controls one or more base stations or radio nodes that communicate radio signals with wireless devices.

SUMMARY

An object of embodiments herein is to provide a mechanism that handles communication in a wireless network in a more efficient manner.

According to an aspect the object is achieved by providing a method performed by a distributed unit of a network node in a wireless network, for establishing a connection between the distributed unit and a central unit connected to a core part of the wireless network. The network node comprises the central unit and at least said distributed unit. The distributed unit performs a Domain Name Server (DNS) lookup for a proxy central unit, which will act as a temporary or initial central unit with regard to a configuration transfer procedure. The distributed unit further receives, from the DNS, an ip address of the proxy central unit. The distributed unit further initiates the configuration transfer procedure by sending a configuration transfer message to the ip address of the proxy central unit. The distributed unit further receives, from the proxy central unit, an ip address of the central unit. The distributed unit further establishes a connection between the distributed unit and the central unit using the received ip address of the central unit.

According to another aspect the object is achieved by providing a method performed by a proxy central unit for establishing a connection between a distributed unit and a central unit of a network node connected to a core part of the wireless network. The network node comprises the central unit and at least said distributed unit. The proxy central unit receives a configuration transfer message from the distributed unit. The proxy central unit further sends the configuration transfer message to the core part of the wireless network for routing the configuration transfer to the central unit. The proxy central unit further receives an ip address of the central unit, from the core part of the wireless network. The proxy central unit further sends the ip address of the central unit to the distributed unit.

It is furthermore provided herein a computer program product comprising instructions, which, when executed on at least one processor, cause the at least one processor to carry out the method above, as performed by the distributed unit or the proxy central unit, respectively. It is additionally provided herein a computer-readable storage medium, having stored thereon a computer program product comprising instructions which, when executed on at least one processor, cause the at least one processor to carry out the method according to the method above, as performed by the distributed unit or the proxy central unit, respectively.

According to yet another aspect of embodiments herein, the object is achieved by providing a distributed unit of a network node in a wireless network, for establishing a connection between the distributed unit and a central unit connected to a core part of the wireless network. The network node comprises the central unit and at least said distributed unit. The distributed unit is configured to perform a Domain Name Server (DNS) lookup for a proxy central unit, which will act as a temporary or initial central unit with regard to a configuration transfer procedure. The distributed unit is configured to receive from the DNS an ip address of the proxy central unit. The distributed unit is configured to initiate the configuration transfer procedure by sending a configuration transfer message to the ip address of the proxy central unit. The distributed unit is configured to receive, from the proxy central unit, an ip address of the central unit. The distributed unit is configured to establish a connection between the distributed unit and the central unit using the received ip address of central unit.

According to still another aspect of embodiments herein, the object is achieved by providing a proxy central unit for establishing a connection between a distributed unit and a central unit of a network node connected to a core part of the wireless network. The network node comprises the central unit and at least said distributed unit. The proxy central unit is configured to receive a configuration transfer message from the distributed unit. The proxy central unit is configured to send the configuration transfer message to the core part of the wireless network for routing the configuration transfer to the central unit. The proxy central unit is configured to receive an ip address of the central unit, from the core part of the wireless network. The proxy central unit is configured to send the ip address of the central unit to the distributed unit.

BRIEF DESCRIPTION OF THE DRAWINGS

Examples of embodiments herein are described in more detail with reference to attached drawings in which:

FIG. 8 is a flowchart depicting methods implemented in a communication system including a host computer, a base station and a user equipment in accordance with some embodiments;

FIG. 9 is a flowchart depicting methods implemented in a communication system including a host computer, a base station and a user equipment in accordance with some embodiments.

DETAILED DESCRIPTION

Wireless communication networks may use a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

Figure 1:
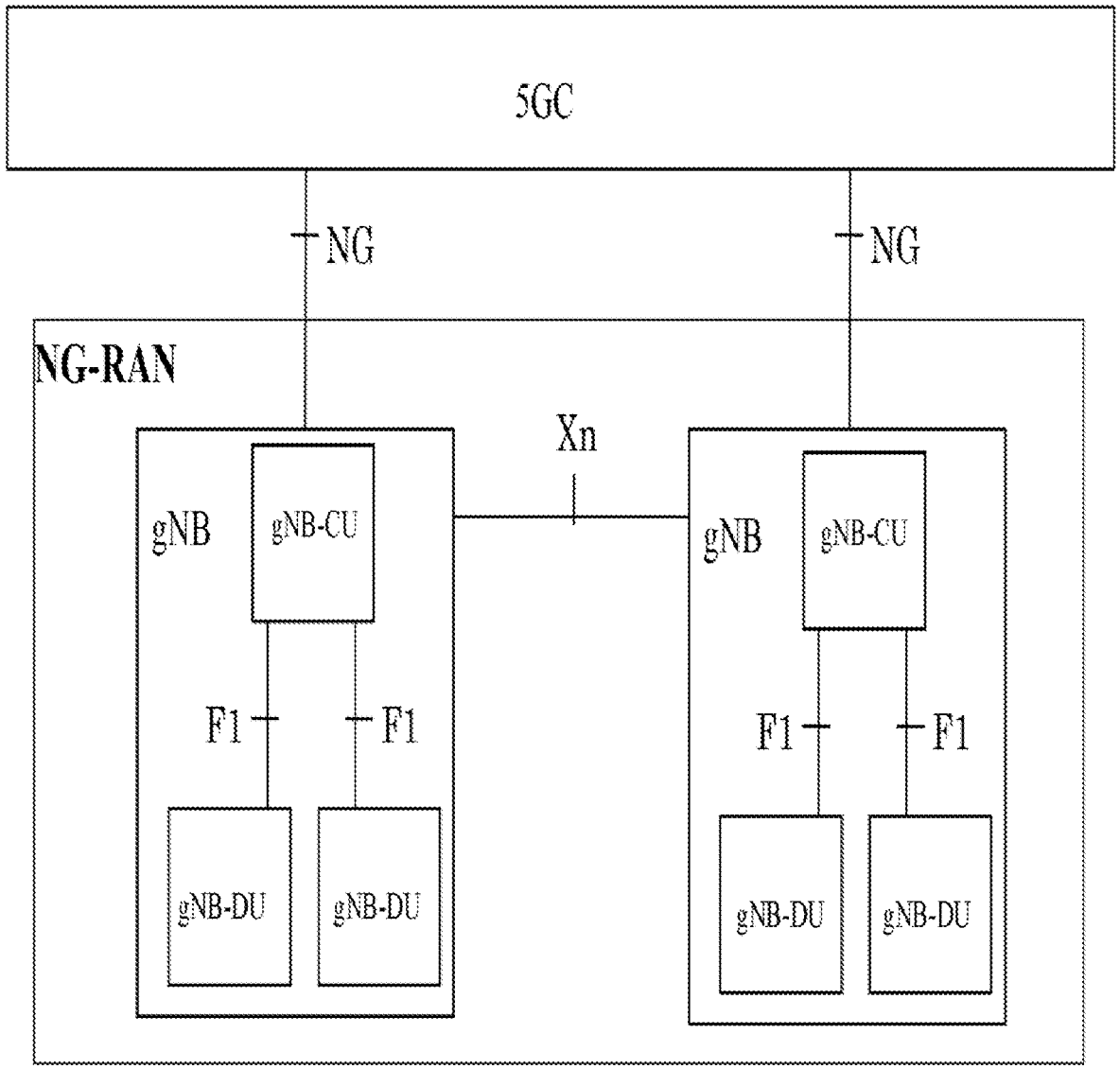
FIG. 1 is a schematic illustration of a 5G RAN architecture.
Figure 1A:
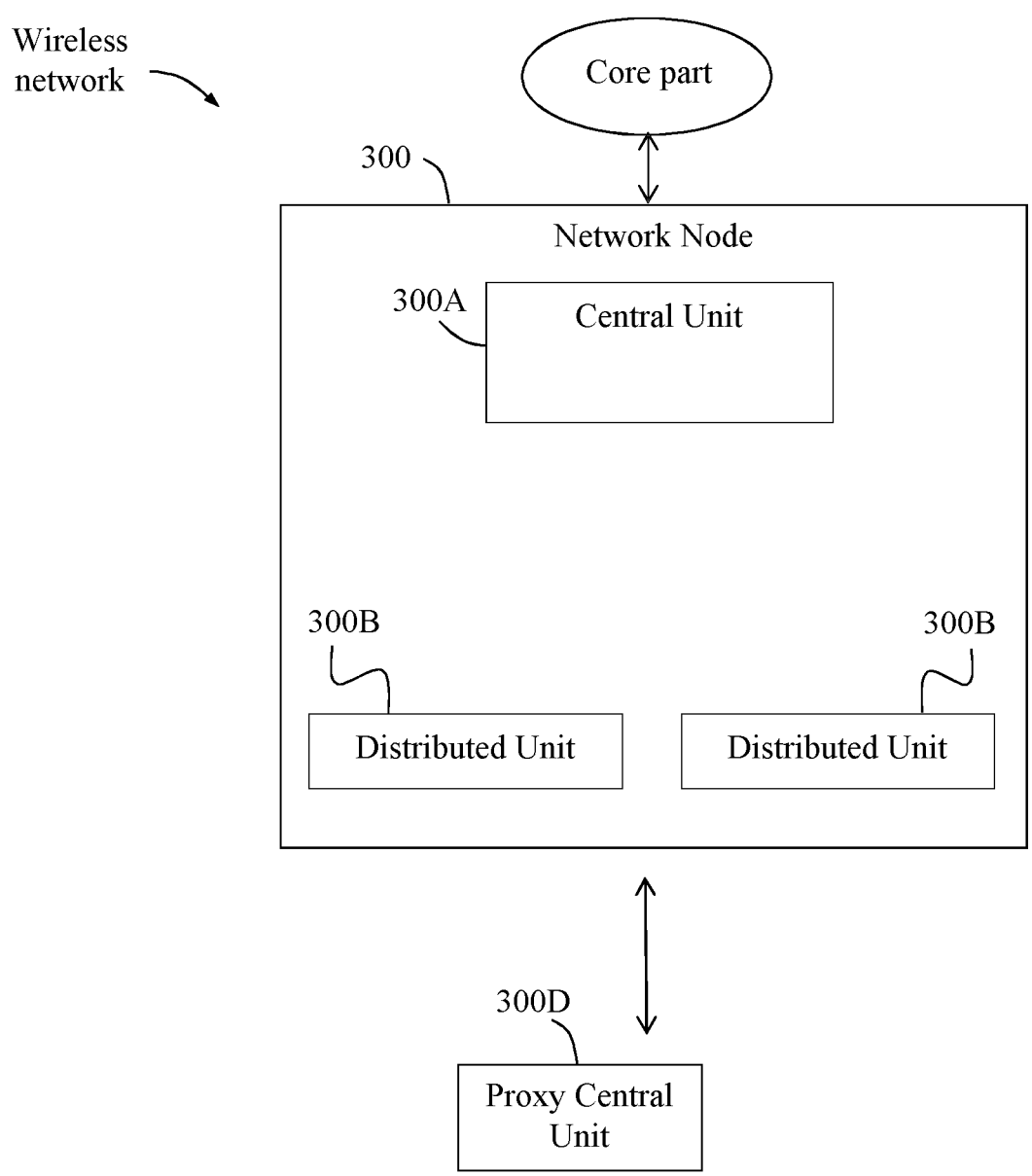
FIG. 1A is a schematic block diagram illustrating embodiments of how a wireless network may be arranged.

Methods herein may in a first aspect be performed by the distributed unit 300B and in a second aspect by the proxy central unit 300D, shown in FIG. 1A. As an alternative, a Distributed Node (DN) and functionality, e.g. comprised in a cloud environment, may be used for performing or partly performing the methods.

An advantage that may be achieved when the embodiments herein are used is that there is no need for manual configuration of the distributed unit (DU) 300B with regard to F1-C TNL ip address configuration of the central unit (CU) 300A after deployment. Only a one time Domain Name Server (DNS) configuration of the proxy central unit 300D is required. Instead of requiring manual configuration of the distributed unit 300B, the distributed unit 300B automatically discovers the F1-C TNL address supporting full auto integration, such as zero touch, of the distributed unit 300B.

Another possible advantage with the embodiments herein is to avoid the need for manual initial F1 Transport Network Layer (TNL) ip address configuration on the distributed unit 300B to establish an underlying Stream Control Transmission Protocol (SCTP) association of the F1 interface towards the central unit 300A. Therefore a mechanism is introduced, where the distributed unit 300B automatically discovers the arbitrary initial proxy CU 300D via a DNS lookup with a constant Fully Qualified Domain (FQDN) and where the proxy CU 300D assists in discovering the proper CU's, e.g. the central unit 300A, ip address via NG Configuration transfer messages.

The embodiments described herein may be used in a procedure performed by the distributed unit 300B of a network node 300 in a wireless network, for establishing a connection between the distributed unit 300B and the central unit 300A connected to a core part of the wireless network, such as the wireless network illustrated in FIG. 1A. The network node 300 comprises the central unit 300A which is connected to a core part of the wireless network, and at least one distributed unit 300B. The network node 300 thus corresponds to each gNB shown in FIG. 1.

A method performed by the distributed unit 300B of the network node 300 may be defined as follows, with reference to FIG. 1A:

A method performed by the distributed unit 300B of the network node 300 in a wireless network, for establishing a connection between the distributed unit 300B and the central unit 300A connected to a core part of the wireless network, wherein the network node 300 comprises the central unit 300A and at least said distributed unit 300B, the method comprising:

performing a DNS lookup for the proxy central unit 300D, which will act as a temporary or initial central unit with regard to a configuration transfer procedure, receiving from the DNS an ip address of the proxy central unit 300D, initiating the configuration transfer procedure by sending a configuration transfer message to the ip address of the proxy central unit 300D, receiving from the proxy central unit 300D, an ip address of the central unit 300A, and establishing a connection between the distributed unit 300B and the central unit 300A using the received ip address of central unit 300A.

A method performed by the proxy central unit 300D may be defined as follows, with reference to FIG. 1A:

A method performed by the proxy central unit 300D for establishing a connection between the distributed unit 300B and the central unit 300A of the network node 300 connected to a core part of the wireless network, wherein the network node 300 comprises the central unit 300A and at least said distributed unit 300B, the method comprising:

receiving a configuration transfer message from the distributed unit 300B, sending the configuration transfer message to the core part of the wireless network for routing the configuration transfer to the central unit 300A, receiving an ip address of the central unit 300A, from the core part of the wireless network, and sending the ip address of the central unit 300A to the distributed unit 300B.

Figure 2:
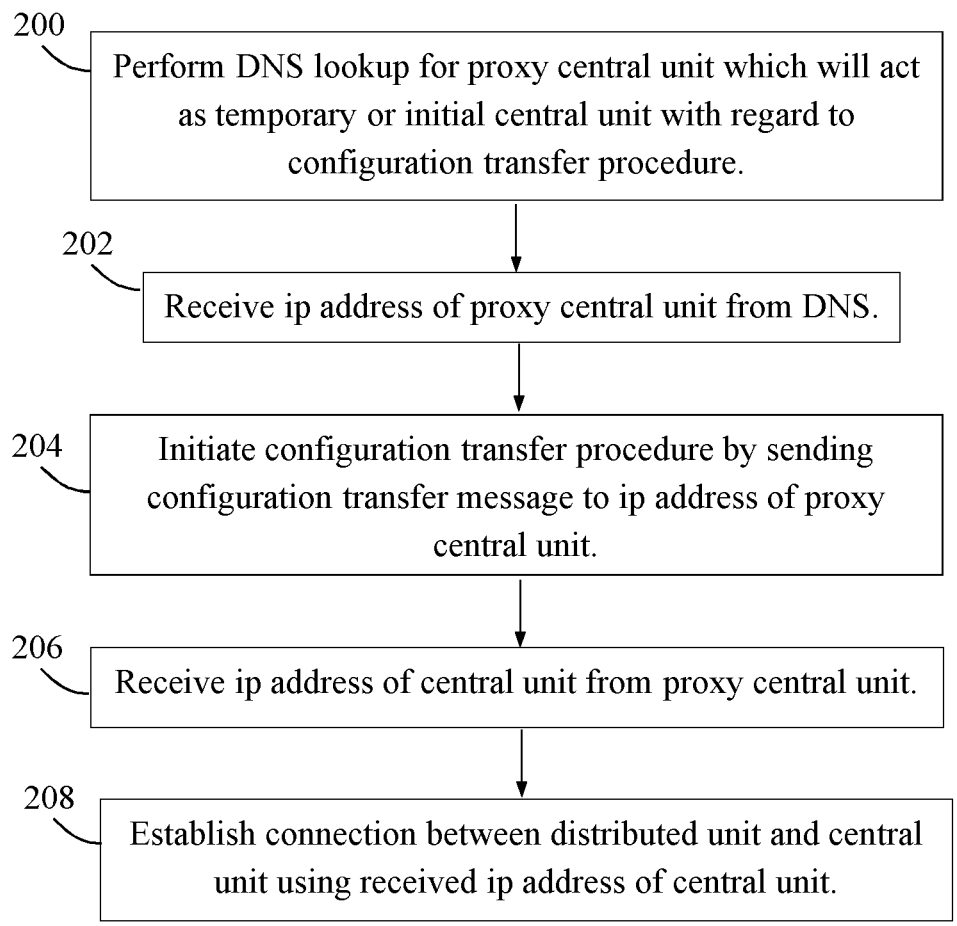
FIG. 2 is a flowchart depicting embodiments of a method performed by a distributed unit in the wireless network.

An example method of how the embodiments herein may be employed in terms of actions performed by a distributed unit, such as the distributed unit 300B, is illustrated by the flow chart in FIG. 2. FIG. 2 thus illustrates an example method in the distributed unit 300B for establishing a connection between the distributed unit 300B and the central unit 300A in a wireless communication network.

A first action 200 illustrates that the distributed unit 300B performs a Domain Name Server (DNS) lookup for a proxy central unit, such as the proxy central unit 300D, which will act as a temporary or initial central unit with regard to a configuration transfer procedure.

In another action 202, the distributed unit 300B receives, from the DNS, an ip address of the proxy central unit 300D.

In another action 204, the distributed unit 300B initiates the configuration transfer procedure by sending a configuration transfer message to the ip address of the proxy central unit 300D.

In another action 206, the distributed unit 300B receives, from the proxy central unit 300D, an ip address of the central unit 300A.

In another action 208, the distributed unit 300B establishes a connection between the distributed unit 300B and the central unit 300A using the received ip address of central unit 300A.

Figure 3:
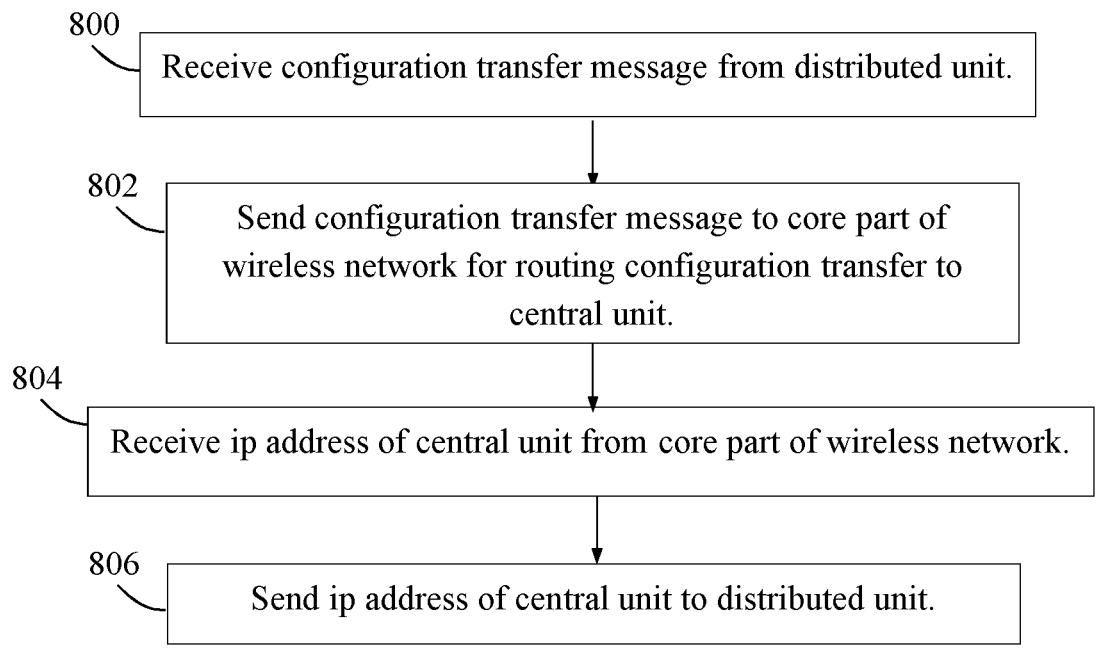
FIG. 3 is a flowchart depicting embodiments of a method performed by a proxy central unit in the wireless network.

Another example method of how the embodiments herein may be employed in terms of actions performed by a proxy central unit, such as the proxy central unit 300D, is further illustrated by the flow chart in FIG. 3. FIG. 3 thus illustrates an example method in the proxy central unit 300D for establishing a connection between the distributed unit 300B and the central unit 300A in a wireless network.

A first action 800 illustrates that the proxy central unit 300D receives a configuration transfer message from the distributed unit 300B.

A further action 802 illustrates that the proxy central unit 300D sends the configuration transfer message to the core part of the wireless network for routing the configuration transfer to the central unit 300A.

In another action 804, the proxy central unit 300D receives an ip address of the central unit 300A, from the core part of the wireless network.

In another action 806, the proxy central unit 300D sends the ip address of the central unit 300A to the distributed unit 300B.

Embodiments herein such as those mentioned above will now be further described and exemplified. The text below is applicable to and may be combined with any suitable embodiment described above.

Figure 4A:
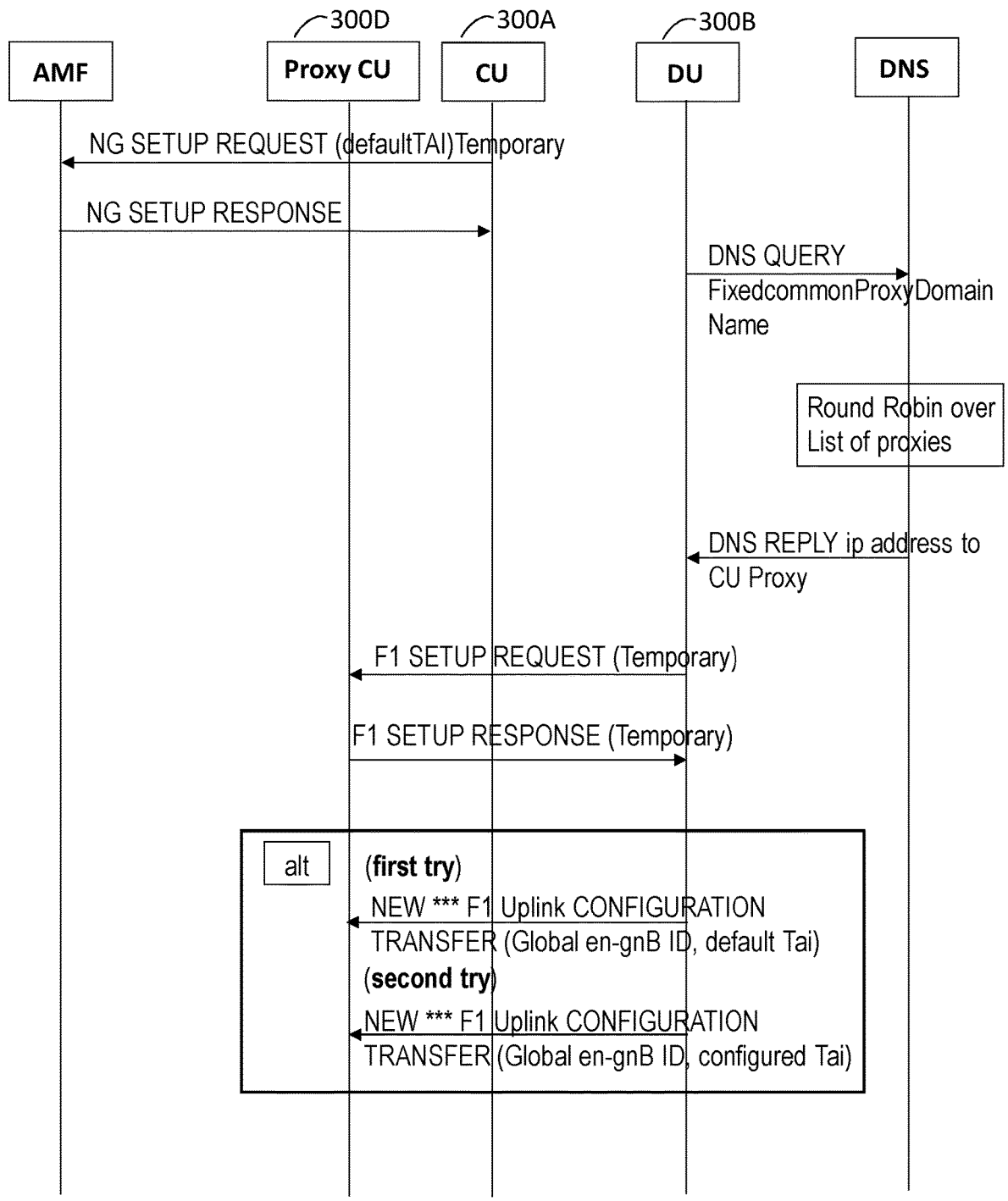
FIGS. 4A and B are signalling schemes according to some embodiments herein.
Figure 4B:
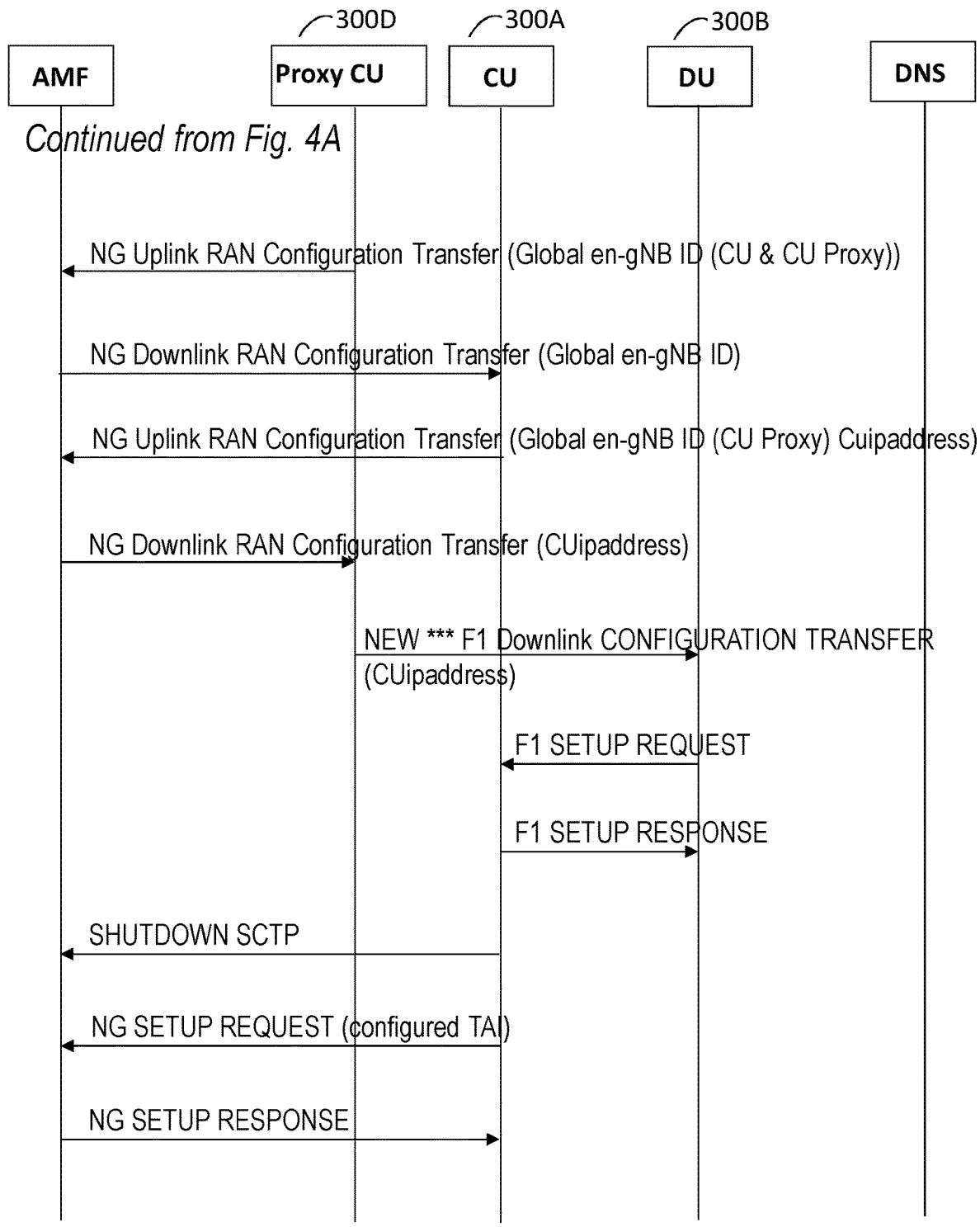

A signalling scheme according to some embodiments herein is illustrated in FIGS. 4A and 4B.

The central unit (CU) 300A needs to be discoverable by the 5GC, but until the distributed unit (DU) 300B has connected to a F1, the CU 300A does not know the tracking area identity (TAI) which needs to be sent in the NG SETUP procedure. Hence the CU 300A initially sends a reserved TAI that is not used by another CU 300A in the network or in the relevant part of the network. Not used by another CU means no CU that is in operation. Another CU that also is in the same startup phase may use the same TAI. This TAI will be used by the 5GC to route to the CU 300A (GNB ID+TAI).

When the DU 300B is started it shall perform a DNS lookup for its initial temporary CU that will act as a Configuration Transfer proxy, e.g. the proxy central unit 300D. This may be done by a DNS lookup of a preconfigured FQDN (e.g. duproxy.eutran.mnc<mnc>.mcc<mcc>0.3gppnetwork.org). The DNS may be configured with a list of F1 TNL ip addresses of selected CUs. Those CUs are able to act as initial proxy with regard to the Configuration Transfer Procedure for an arbitrary DU 300B, i.e. a DU that does not match the CU's and DU's common NR GNB ID. The DNS server replies to the DNS requests with an ip address from that list in round robin fashion in order to distribute the proxy central units 300D equally to the DUs 300B.

The DU 300B will then initiate the new F1 Configuration Transfer Procedure containing the DU's 300B ip address and the DU's 300A NR GNB ID as well as the Target CU's TAI. Since the TAI may be the reserved TAI or a correct TAI, the DU 300B may start two parallel procedures, where one will fail and one will give result. The proxy central unit 300D shall send the Configuration Transfer to the 5GC which routes it to the correct NR-GNB CU 300A, which answers the Configuration Transfer with its own ip address and the CU's 300A NR-GNB ID.

When the Configuration Transfer is received in the proxy CU 300D, the proxy CU 300D forwards the information with the NEW F1 message Configuration Transfer downlink to the DU 300B.

The DU 300B has now received the CU's 300A ip address and can finally establish the F1.

When the CU 300A has received the TAI via the F1 it may either update the 5GC with TAI info or establish a new NG SETUP.

Figure 5:
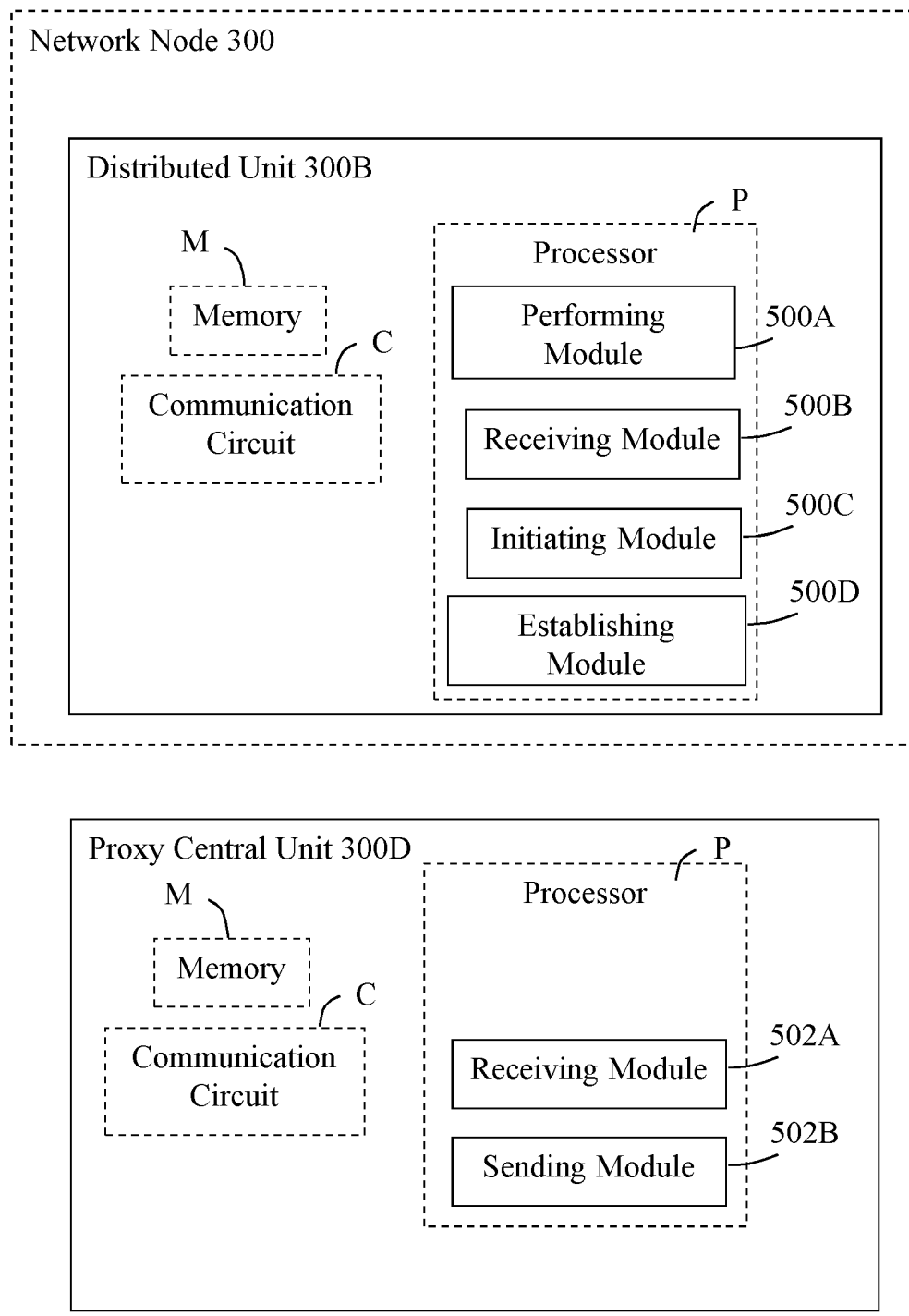
FIG. 5 is a schematic block diagram illustrating a distributed unit and a proxy central unit according to some embodiments herein.

The block diagram in FIG. 5 illustrates a detailed but non-limiting example of how the distributed unit 300B and the proxy central unit 300D, respectively may be structured to bring about the above-described embodiments herein. In this figure, the distributed unit 300B and the proxy central unit 300D may be configured to operate according to any of the examples and embodiments of employing the solution as described herein, where appropriate. Each of the distributed unit 300B and the proxy central unit 300D is shown to comprise a processor "P", a memory "M" and a communication circuit "C" with suitable equipment for transmitting and receiving signals and messages in the manner described herein.

The communication circuit C in each of the distributed unit 300B and the proxy central unit 300D thus comprises equipment configured for communication with each other using a suitable protocol for the communication depending on the implementation. The solution is however not limited to any specific types of signals or protocols.

The distributed unit 300B is, e.g. by means of units, modules or the like, configured or arranged to perform at least some of the actions of the flow chart in FIG. 2 as follows. Further, the proxy central unit 300D is, e.g. by means of units, modules or the like, configured or arranged to perform at least some of the actions of the flow chart in FIG. 3 as follows.

The distributed unit 300B is arranged to establish a connection between the distributed unit 300B and a central unit 300A. The distributed unit 300B is configured to perform a Domain Name Server (DNS) lookup for the proxy central unit 300D, which will act as a temporary or initial central unit with regard to a configuration transfer procedure. This operation may be performed by a performing module 500A in the distributed unit 300B, as illustrated in action 200.

The distributed unit 300B is also configured to receive from the DNS an ip address of the proxy central unit 300D. This operation may be performed by a receiving module 500B, as illustrated in action 202.

The distributed unit 300B is also configured to initiate the configuration transfer procedure by sending a configuration transfer message to the ip address of the proxy central unit 300D. This operation may be performed by an initiating module 500C, as illustrated in action 204.

The distributed unit 300B may also be configured to receive, from the proxy central unit 300D, an ip address of the central unit 300A. This operation may be performed by the receiving module 500B, as illustrated in action 206. The distributed unit 300B is also configured to establish a connection between the distributed unit 300B and the central unit 300A using the received ip address of central unit 300A. This operation may be performed by an establishing module 500D, as illustrated in action 208.

The proxy central unit 300D is arranged to establish a connection between the distributed unit 300B and the central unit 300A. The proxy central unit 300D is configured to receive a configuration transfer message from the distributed unit 300B. This operation may be performed by a receiving module 502A in the proxy central unit 502A, as illustrated in action 800.

The proxy central unit 300D is configured to send the configuration transfer message to the core part of the wireless network for routing the configuration transfer to the central unit 300A. This operation may be performed by a sending module 502B in the proxy central unit 300D, as illustrated in action 802.

The proxy central unit 300D may also be configured to receive an ip address of the central unit 300A, from the core part of the wireless network. This operation may be performed by the receiving module 502A, as illustrated in action 804.

The proxy central unit 300D may also be configured to send the ip address of the central unit 300A to the distributed unit 300B. This operation may be performed by the sending module 502B, as illustrated in action 806.

It should be noted that FIG. 5 illustrates various functional modules in the distributed unit 300B and the proxy central unit 300D, respectively, and the skilled person is able to implement these functional modules in practice using suitable software and hardware equipment. Thus, the solution is generally not limited to the shown structures of the distributed unit 300B and the proxy central unit 300D and the functional modules therein may be configured to operate according to any of the features, examples and embodiments described in this disclosure, where appropriate.

The functional modules 500A-D and 502A-B described above may be implemented in the distributed unit 300B and the proxy central unit 300D, respectively, by means of program modules of a respective computer program comprising code means which, when run by the processor P causes the distributed unit 300B and the proxy central unit 300D to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the distributed unit 300B and the proxy central unit 300D in the form of a memory having a computer readable medium and being connected to the processor P. The computer program product or memory M in each of the distributed unit 300B and the proxy central unit 300D thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective distributed unit 300B and proxy central unit 300D.

The solution described herein may be implemented in each of the distributed unit 300B and the proxy central unit 300D by a computer program comprising instructions which, when executed on at least one processor, cause the at least one processor to carry out the actions according to any of the above embodiments and examples, where appropriate. The solution may also be implemented at each of the distributed unit 300B and the proxy central unit 300D in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "network node", "wireless network", "configuration transfer message", "distributed unit", "central unit", "proxy central unit" and "configuration transfer procedure" have been used throughout this disclosure, although any other corresponding entities, functions, and/or parameters could also be used having the features and characteristics described here. The solution may be implemented according to the appended embodiments.

Some example embodiments numbered 1-30 are described below. The following embodiments refer among other things to FIG. 1A, FIG. 2, FIG. 3, FIG. 4AB and FIG. 5.

Embodiment 1. A method performed by a distributed unit (300B) of a network node (300) in a wireless network, for establishing a connection between the distributed unit (300B) and a central unit (300A) connected to a core part of the wireless network, wherein the network node (300) comprises the central unit (300A) and at least said distributed unit (300B), the method comprising:
  performing (200) a Domain Name Server, DNS, lookup for a proxy central unit (300D), which will act as a temporary or initial central unit with regard to a configuration transfer procedure,
  receiving (202) from the DNS an ip address of the proxy central unit (300D),
  initiating (204) the configuration transfer procedure by sending a configuration transfer message to the ip address of the proxy central unit (300D),
  receiving (206), from the proxy central unit (300D), an ip address of the central unit (300A), and
  establishing (208) a connection between the distributed unit (300B) and the central unit (300A) using the received ip address of central unit (300A).

Embodiment 2. The method according to embodiment 1 wherein the configuration transfer message comprises anyone out of an ip address of the distributed unit (300B), a distributed unit (300B) network node identity and an initiating tracking area identity, TAI.

Embodiment 3. The method according to embodiment 2, wherein the initiating tracking area identity is controlled by and reserved for a core part of the network to which the central unit (300A) is connected.

Embodiment 4. The method according to any one of embodiments 2-3, wherein the initiating tracking area identity is a tracking area identity to which one or more of the cells controlled by the distributed unit belongs.

Embodiment 5. The method according to any one of embodiments 2-3, wherein the initiating tracking area identity is a tracking area identity to which none of the cells controlled by the distributed unit belongs, but where the tracking area identity is still used to identify the core network part of the network to which the central unit (300A) is connected.

Embodiment 6. The method according to any one of embodiments 1-2, wherein the ip address is the ip address of the distributed unit (300B) or the central unit (300A).

Embodiment 7. A method according to any one of embodiments 1-2, wherein the ip address is the ip address of a security gateway through which the connection between the distributed unit (300B) and the central unit (300A) is performed.

Embodiment 8. A method performed by a proxy central unit (300D) for establishing a connection between a distributed unit (300B) and a central unit (300A) of a network node (300) connected to a core part of the wireless network, wherein the network node (300) comprises the central unit (300A) and at least said distributed unit (300B), the method comprising:
- receiving (400) a configuration transfer message from the distributed unit (300B),
- sending (402) the configuration transfer message to the core part of the wireless network for routing the configuration transfer to the central unit (300A),
- receiving (404) an ip address of the central unit (300A), from the core part of the wireless network, and
- sending (406) the ip address of the central unit (300A) to the distributed unit (300B).

Embodiment 9. The method according to embodiment 8, wherein the configuration transfer message comprises anyone out of an ip address of the distributed unit (300B), a distributed unit (300B) network node identity and an initiating tracking area identity, TAI.

Embodiment 10. The method according to embodiment 9, wherein the initiating tracking area identity is controlled by and reserved for a core part of the network to which the central unit (300A) is connected.

Embodiment 11. The method according to any one of embodiments 9-10, wherein the initiating tracking area identity is a tracking area identity to which one or more of the cells controlled by the distributed unit belongs.

Embodiment 12. The method according to any one of embodiments 9-10, wherein the initiating tracking area identity is a tracking area identity to which none of the cells controlled by the distributed unit belongs, but where the tracking area identity is still used to identify the core network part of the network to which the central unit (300A) is connected.

Embodiment 13. The method according to any one of embodiments 8-9, wherein the ip address is the ip address of the distributed unit (300B) or the central unit (300A).

Embodiment 14. A method according to any one of embodiments 8-9, wherein the ip address is the ip address of a security gateway through which the connection between the distributed unit (300B) and the central unit (300A) is performed.

Embodiment 15. A distributed unit (300B) of a network node (300) in a wireless network, for establishing a connection between the distributed unit (300B) and a central unit (300A) connected to a core part of the wireless network, wherein the network node (300) comprises the central unit (300A) and at least said distributed unit (300B), wherein the distributed unit (300B) is configured to:
- perform a Domain Name Server, DNS, lookup for a proxy central unit (300D), which will act as a temporary or initial central unit with regard to a configuration transfer procedure,
- receive from the DNS an ip address of the proxy central unit (300D),
- initiate the configuration transfer procedure by sending a configuration transfer message to the ip address of the proxy central unit (300D),
- receive, from the proxy central unit (300D), an ip address of the central unit (300A), and
- establish a connection between the distributed unit (300B) and the central unit (300A) using the received ip address of central unit (300A).

Embodiment 16. The distributed unit (300B) according to embodiment 15 wherein the configuration transfer message comprises anyone out of an ip address of the distributed unit (300B), a distributed unit (300B) network node identity and an initiating tracking area identity, TAI.

Embodiment 17. The distributed unit (300B) according to embodiment 16, wherein the initiating tracking area identity is adapted to be controlled by and reserved for a core part of the network to which the central unit (300A) is connected.

Embodiment 18. The distributed unit (300B) according to any one of embodiments 16-17, wherein the initiating tracking area identity is a tracking area identity to which one or more of the cells controlled by the distributed unit belongs.

Embodiment 19. The distributed unit (300B) according to any one of embodiments 16-17, wherein the initiating tracking area identity is a tracking area identity to which none of the cells controlled by the distributed unit belongs, but where the tracking area identity is still adapted to be used to identify the core network part of the network to which the central unit (300A) is connected.

Embodiment 20. The distributed unit (300B) according to any one of embodiments 15-16, wherein the ip address is the ip address of the distributed unit (300B) or the central unit (300A).

Embodiment 21. A distributed unit (300B) according to any one of embodiments 15-16, wherein the ip address is the ip address of a security gateway through which the connection between the distributed unit (300B) and the central unit (300A) is performed.

Embodiment 22. A proxy central unit (300D) of a network node (300) for establishing a connection between a distributed unit (300B) and a central unit (300A) of a network node (300) connected to a core part of the wireless network, wherein the network node (300) comprises the central unit (300A) and at least said distributed unit (300B), wherein the proxy central unit (300D) is configured to:
- receive a configuration transfer message from the distributed unit (300B),
- send the configuration transfer message to the core part of the wireless network for routing the configuration transfer to the central unit (300A),
- receive an ip address of the central unit (300A), from the core part of the wireless network, and
- send the ip address of the central unit (300A) to the distributed unit (300B).

Embodiment 23. The proxy central unit (300D) according to embodiment 22, wherein the configuration transfer message comprises anyone out of an ip address of the distributed unit (300B), a distributed unit (300B) network node identity and an initiating tracking area identity, TAI.

Embodiment 24. The proxy central unit (300D) according to embodiment 23, wherein the initiating tracking area identity is adapted to be controlled by and reserved for a core part of the network to which the central unit (300A) is connected.

Embodiment 25. The proxy central unit (300D) according to any one of embodiments 23-24, wherein the initiating tracking area identity is a tracking area identity to which one or more of the cells controlled by the distributed unit belongs.

Embodiment 26. The proxy central unit (300D) according to any one of embodiments 23-24, wherein the initiating tracking area identity is a tracking area identity to which none of the cells controlled by the distributed unit belongs, but where the tracking area identity is still adapted to be used to identify the core network part of the network to which the central unit (300A) is connected.

Embodiment 27. The proxy central unit (300D) according to any one of embodiments 22-23, wherein the ip address is the ip address of the distributed unit (300B) or the central unit (300A).

Embodiment 28. A proxy central unit (300D) according to any one of embodiments 22-23, wherein the ip address is the ip address of a security gateway through which the connection between the distributed unit (300B) and the central unit (300A) is performed.

Embodiment 29. A computer program comprising instructions, which when executed by a processor, causes the processor to perform actions according to any of the embodiments 1-7 or according to any of the embodiments 8-14.

Embodiment 30. A carrier comprising the computer program of embodiment 29, wherein the carrier is one of an electronic signal, an optical signal, an electromagnetic signal, a magnetic signal, an electric signal, a radio signal, a microwave signal, or a computer-readable storage medium.

Further Extensions and Variations

Figure 6:
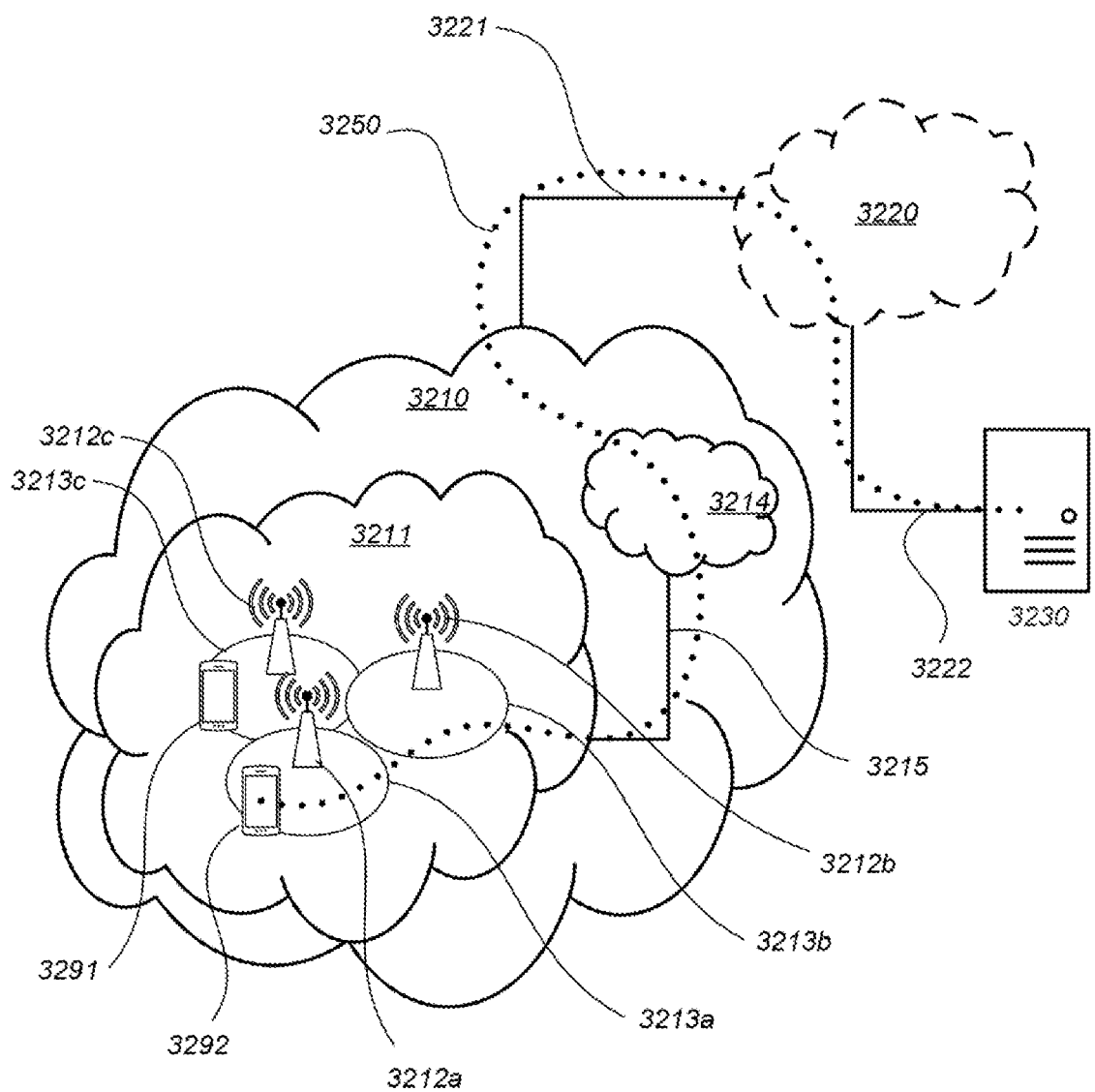
FIG. 6 is a schematic block diagram illustrating a host computer communicating via a base station with a user equipment over a partially wireless connection in accordance with some embodiments.

With reference to FIG. 6, in accordance with an embodiment, a communication system includes a telecommunication network 3210 e.g. a WLAN, such as a 3GPP-type cellular network, which comprises an access network 3211, such as a radio access network, and a core network 3214. The access network 3211 comprises a plurality of base stations 3212a, 3212b, 3212c, such as access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 6 as a whole enables connectivity between one of the connected UEs 3291, 3292 and the host computer 3230. The connectivity may be described as an over-the-top (OTT) connection 3260. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 7. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 7) served by the base station 3320. The communication interface 3326 may be configured to facilitate a connection 3360 to the host computer 3310. The connection 3360 may be direct or it may pass through a core network (not shown in FIG. 7) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 7:
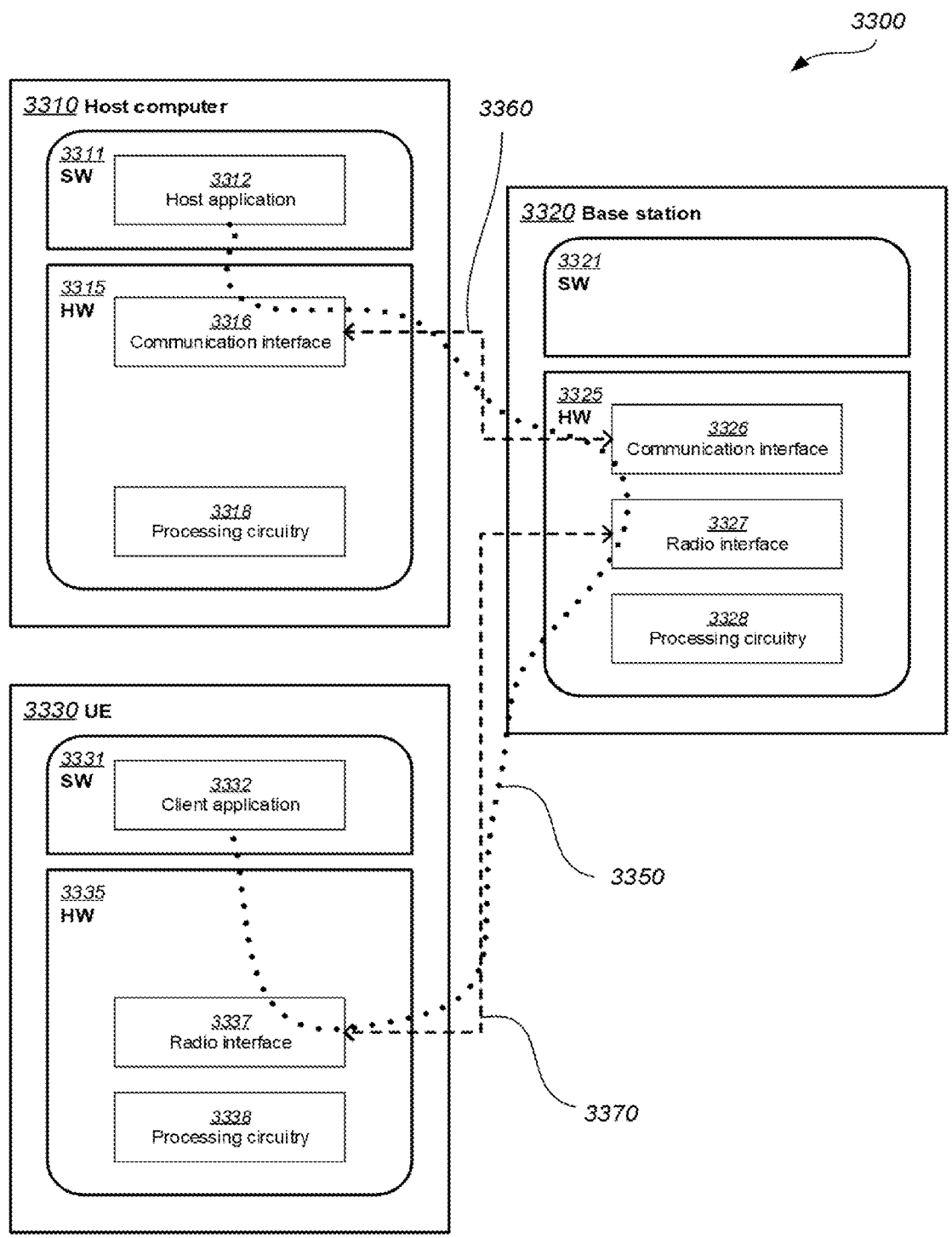
FIG. 7 is a schematic overview of a host computer communicating via a base station with a user equipment over a partially wireless connection in accordance with some embodiments.

It is noted that the host computer 3310, base station 3320 and UE 3330 illustrated in FIG. 7 may be identical to the host computer 3230, one of the base stations 3212a, 3212b, 3212c and one of the UEs 3291, 3292 of FIG. 6, respectively. This is to say, the inner workings of these entities may be as shown in FIG. 7 and independently, the surrounding network topology may be that of FIG. 6.

In FIG. 7, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the efficiency in communication and thereby provide benefits such as better utilization of resources in the network.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In some embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 8 is a flowchart illustrating a method implemented in a communication system, in accordance with one embodiment. The communication system includes a host computer, a base station such as a AP STA, and a UE such as a Non-AP STA which may be those described with reference to FIGS. 6 and 7. For simplicity of the present disclosure, only drawing references to FIG. 8 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 9 is a flowchart illustrating a method implemented in a communication system, in accordance with one embodiment. The communication system includes a host computer, a base station such as a AP STA, and a UE such as a Non-AP STA which may be those described with reference to FIGS. 6 and 7. For simplicity of the present disclosure, only drawing references to FIG. 9 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figures 10, 11:
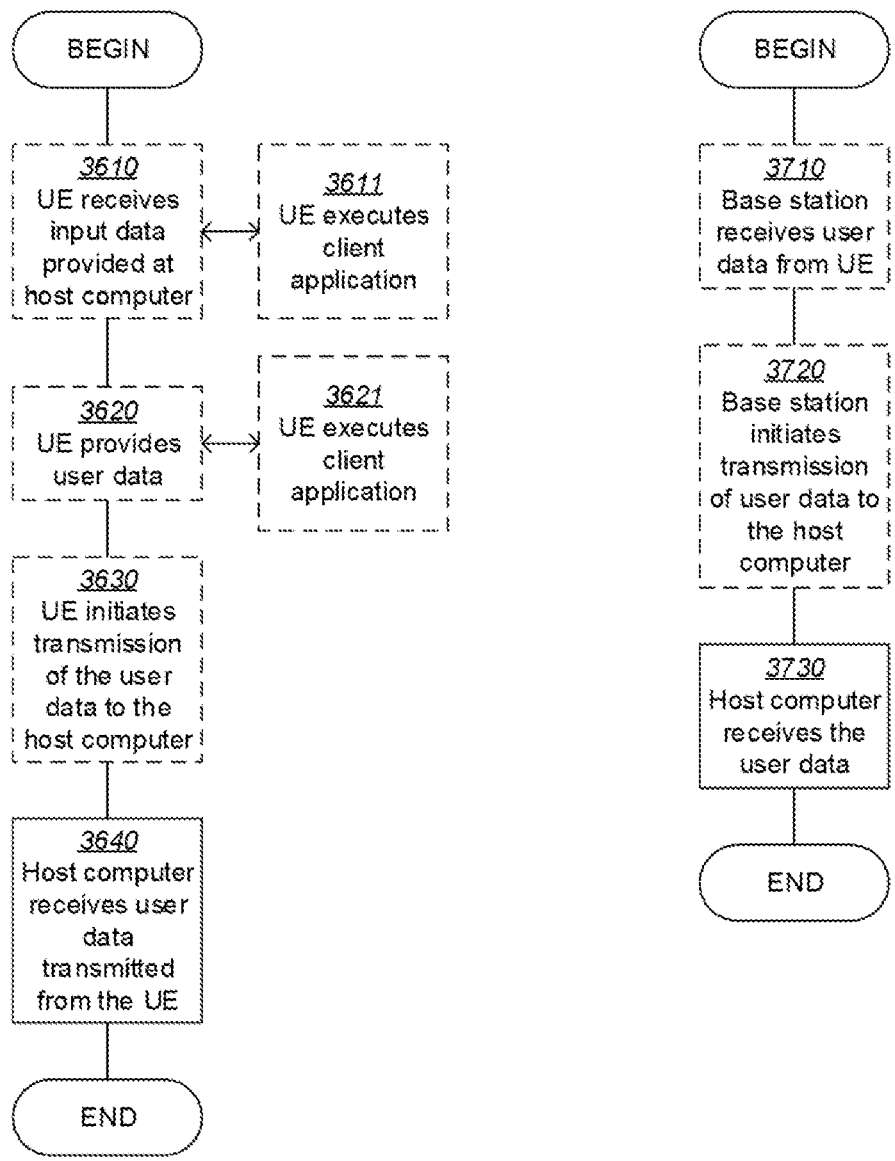
FIG. 10 is a flowchart depicting methods implemented in a communication system including a host computer, a base station and a user equipment in accordance with some embodiments.
FIG. 11 is a flowchart depicting methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station such as a AP STA, and a UE such as a Non-AP STA which may be those described with reference to FIGS. 6 and 7. For simplicity of the present disclosure, only drawing references to FIG. 10 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station such as an AP STA, and a UE such as a Non-AP STA which may be those described with reference to FIGS. 6 and 7. For simplicity of the present disclosure, only drawing references to FIG. 11 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

The invention claimed is:

1. A method performed by a distributed unit of a network node in a wireless network for establishing a connection between the distributed unit and a central unit connected to a core part of the wireless network, the network node comprising the central unit and at least the distributed unit, and the distributed unit preconfigured with a constant Fully Qualified Domain (FQDN), the method comprising:
    performing a Domain Name Server (DNS) lookup for a proxy central unit of the distributed unit, which is temporarily performing the functions of the central unit with regard to a configuration transfer procedure;
    receiving from the DNS an internet protocol (ip) address of the proxy central unit, the ip address being the ip address of a security gateway through which the connection between the distributed unit and the central unit is performed;
    initiating the configuration transfer procedure by sending a configuration transfer message to the ip address of the proxy central unit;
    receiving, from the proxy central unit, an ip address of the central unit; and
    establishing a connection between the distributed unit and the central unit using the received ip address of the central unit.

2. The method according to claim 1 wherein the configuration transfer message comprises any one of an ip address of the distributed unit, a distributed unit network node identity and an initiating tracking area identity.

3. The method according to claim 2, wherein the initiating tracking area identity is controlled by and reserved for a core part of the network to which the central unit is connected.

4. The method according to claim 2, wherein the initiating tracking area identity is a tracking area identity to which one or more of the cells controlled by the distributed unit belongs.

5. The method according to claim 2, wherein the initiating tracking area identity is a tracking area identity to which none of the cells controlled by the distributed unit belongs, but where the tracking area identity is still used to identify the core network part of the network to which the central unit is connected.

6. A distributed unit of a network node in a wireless network, for establishing a connection between the distributed unit and a central unit connected to a core part of the wireless network, the network node comprising the central unit and at least the distributed unit, the distributed unit being preconfigured with a constant Fully Qualified Domain (FQDN) and configured to:
    perform a Domain Name Server (DNS) lookup for a proxy central unit of the distributed unit, which is temporarily performing the functions of the central unit with regard to a configuration transfer procedure;
    receive from the DNS an internet protocol (ip) address of the proxy central unit, the ip address being the ip address of a security gateway through which the connection between the distributed unit and the central unit is performed;
    initiate the configuration transfer procedure by sending a configuration transfer message to the ip address of the proxy central unit the initiating tracking area identity is adapted to be controlled by and reserved for a core part of the network to which the central unit is connected;
    receive, from the proxy central unit, an ip address of the central unit; and
    establish a connection between the distributed unit and the central unit using the received ip address of the central unit.

7. The distributed unit according to claim 6 wherein the configuration transfer message comprises any one of an ip address of the distributed unit, a distributed unit network node identity and an initiating tracking area identity.

8. The distributed unit according to claim 7, wherein the initiating tracking area identity is adapted to be controlled by and reserved for a core part of the network to which the central unit is connected.

* * * * *